United States Patent

Prause

[11] Patent Number: 5,774,780
[45] Date of Patent: Jun. 30, 1998

[54] PROCESS FOR PRODUCTION OF A SHAPED PART

[75] Inventor: Oliver Prause, Munich, Germany

[73] Assignee: Bayerische Metallwerke GmbH, Dachau, Germany

[21] Appl. No.: 562,028

[22] Filed: Nov. 22, 1995

[30] Foreign Application Priority Data

Nov. 27, 1994 [DE] Germany .......................... 44 42 161.3

[51] Int. Cl.$^6$ ..................................................... B22F 3/12
[52] U.S. Cl. .................. 419/12; 419/19; 419/20; 419/30; 419/32; 419/38; 419/41; 419/42; 419/44; 419/49; 419/54; 419/55
[58] Field of Search .................. 419/20, 12, 19, 419/30, 32, 38, 49, 44, 54, 55, 41, 42

[56] References Cited

U.S. PATENT DOCUMENTS

| | | | |
|---|---|---|---|
| 3,585,342 | 6/1971 | Kosco | 219/69 E |
| 3,650,736 | 3/1972 | Broom | 75/200 |
| 3,775,100 | 11/1973 | Kizer | 75/212 |
| 3,802,851 | 4/1974 | Dunham | 29/182.5 |
| 3,911,309 | 10/1975 | Kümmel et al. | 313/346 R |
| 3,929,476 | 12/1975 | Kirby, Jr. et al. | 75/214 |
| 4,302,321 | 11/1981 | DeNora et al. | |
| 4,370,299 | 1/1983 | Morozumi | 420/429 |
| 4,678,718 | 7/1987 | Wang | 428/560 |
| 4,923,673 | 5/1990 | Litty | 419/20 |
| 4,946,646 | 8/1990 | Gamo et al. | |
| 5,284,614 | 2/1994 | Chen et al. | 419/20 |
| 5,512,240 | 4/1996 | Matusda et al. | 420/430 |
| 5,590,386 | 12/1996 | Patrician et al. | 419/20 |

FOREIGN PATENT DOCUMENTS

| | | |
|---|---|---|
| 0 223 286 A1 | 5/1987 | European Pat. Off. . |
| 0 573 195 A1 | 12/1993 | European Pat. Off. . |
| 36 37 930 | 11/1986 | Germany . |

OTHER PUBLICATIONS

International Search Report dated Mar. 18, 1996.

*Primary Examiner*—Daniel J. Jenkins
*Attorney, Agent, or Firm*—McAulay Fisher Nissen Goldberg & Kiel, LLP

[57] ABSTRACT

A process for the production of a shaped part which is produced from a high-melting point metal powder with crystalline sinter-activating additives. The process includes the steps of preparing, compressing and sintering the metal powder. Prior to the sintering step, the final contour of the shaped part is substantially shaped. The process is primarily directed for the production of shields for radiation protection, as melting crucibles or as electrodes.

20 Claims, 1 Drawing Sheet

PROCESS FOR PRODUCTION OF A SHAPED PART

BACKGROUND OF THE INVENTION a) Field of the Invention

The invention is directed to a process for the production of a shaped part which is produced from a high-melting point metal powder with crystalline sinter-activating additives.

b) Description of the Related Art

Structural parts or shaped parts which are produced by a process of this kind are used, for instance, as shields for radiation protection, as melting crucibles or as electrodes. The electrodes, principally tungsten electrodes, are used in particular for inert gas shielded arc welding, plasma arc welding, plasma cutting, and for discharge lamps and are produced substantially by the following process steps: powder production, mixing, pressing, sintering, and shaping the final contour of the electrode with mechanical working, e.g., hammering, grinding and/or cutting.

In manufacturing the electrodes, the effort is made to achieve in these electrodes a high density, homogeneous distribution of the dopant in the tungsten matrix material of the metal powder, and a defined structure, i.e., a predetermined grain formation.

In order to produce a shaped part such as the electrode mentioned above, it is known to use a tungsten metal powder with a purity of approximately 99.95% and corresponding dopants with a low electron work function, e.g., $ThO_2$, $Y_2O_3$, $CeO_2$, $ZrO_2$, and/or $La_2O_3$. These dopants lower the work function compared with pure tungsten, i.e., during operation the emission current density of the electrode is increased while maintaining the same temperature. A finely dispersed, homogeneous distribution of the dopant in the final product results from intensive mixing—preparation—of the tungsten powder with the dopants.

The prepared metal powder with the dopants is then pressed to form an intermediate product, e.g., cylindrical rods, wherein a uniform density is aimed for in the intermediate product.

The intermediate product is transformed to the metallic state during sintering by applying an electric current—Coolidge process. Due to the electrical resistance of the compressed material, a temperature of roughly 2600° to 3000° is reached and is maintained for approximately 15 to 30 min. In this way, the metal powder with the dopant is compacted to approximately 80 to 90% of the theoretical density. This process is effected in a dry hydrogen atmosphere to prevent oxidation at the surface of the tungsten material.

Depending on the degree of deformation, the intermediate product which is now sintered is reshaped mechanically to final contours at a temperature of 900° to 1600° C., e.g., by hammering. The final dimensions are achieved by subsequent grinding, surface impurities and possible cracks are eliminated at the same time.

However, the disadvantage in known shaped parts consists in that their manufacture is very expensive due to the many process steps and very costintensive due to high energy consumption. In addition, possibilities for shaping the shaped parts are severely limited.

Further, the dopants evaporate during the manufacturing process. In electrodes, for example, this may lead to an inhomogeneous distribution of the dopants in the electrode and accordingly to inhomogeneous properties in the electrode during operation.

OBJECT AND SUMMARY OF THE INVENTION

The primary object of the present invention is to improve a process for the production of a shaped part of the above type in such a way that the shaped part can be produced in a substantially simpler and more economical manner and with more exactly determined properties while avoiding the disadvantages mentioned above. In particular, the shaping possibilities are also expanded.

This object is met by a process of the above type wherein the metal powder is prepared, compressed and sintered, and wherein the final contour of the shaped part is substantially shaped prior to sintering.

As a result of the process according to the invention for the production of a shaped part, it is now possible to manufacture complex geometries in different dimensions, since the final contour of the shaped part is substantially determined by means of a shaping process prior to sintering, that is, when the compacted metal powder with the dopants/additives has approximately 50 to 70% of the theoretical density and has not yet been transformed to the metallic state. The structure of the shaped part is now no longer defined during production by the limited shaping and machinability of the known sintered intermediate products.

In order to reduce the sintering temperature and sintering time, a crystalline sinter-activating additive is added to the metal powder.

The shaped part is advantageously constructed as an electrode, especially as a cathode, and primarily contains at least one dopant made from a material with a low work( function. For instance, it is now easily possible to produce a hollow cathode or a cored electrode with the features according to the invention.

The process for producing a shaped part according to the invention has the further advantage that it reduces the tendency of the high-melting point matrix material of the metal powder of the shaped part to recrystallize. In particular, the reshaping which was previously necessary in the production of electrodes after sintering and the predeformation of the electrode brought about thereby, e.g., by means of hammering, is now completely dispensed with. An intensive recrystallization of the matrix material of the metal powder in the tip of the electrode which is brought about by the high operating temperature during use reduces the diffusion-controlled material transfer of the emission-promoting dopant at the surface of the electrode tip.

Up to 5 percent by weight of the dopant with a low work function is advisably introduced into the metal powder prior to pressing. The dopant is generally formed of one or more elements or element compounds with electron configurations which are unstable with respect to energy, i.e., with incompletely occupied d—and f—electron shells, with electron donor action. These elements or element compounds chiefly form oxides and/or borides of the elements of groups IIIB to IVB of the periodic table and the first three elements of the lanthanide and actinide groups. In particular, these are preferably $Y_2O_3$, $ZrO_2$, $La_2O_3$, $CeO_2$ and/or $LaB_6$.

The metal powder advisably contains up to 1.0 percent by weight of the sinter-activating additive prior to pressing.

The sinter-activating additive is formed by the elements of group VIII of the periodic table. Nickel, palladium and/or platinum are preferably used.

Owing to the sinter-activating additives, high compression, is achieved at low sintering temperatures so as to enable sintering in the furnace.

High density, low distortion, and low evaporation losses of the dopants and additives are ensured by adapting the sintering parameters, e.g., the temperature-time curve. The sintering parameters to be adapted are determined, among others, by the type of metal powder, the grain size and grain distribution, the preparation process for the doped metal powder, the content of additives and dopants, and the green density.

The temperature-time profile which is determined in dependence on the features mentioned above is run through for sintering the metal powder. The sintering process is effected in a dry hydrogen and/or argon gas atmosphere in order to prevent oxidation of the matrix material during sintering.

The low sintering temperature has an advantageous effect on the considerably reduced evaporation of the dopant with a low work function. Further, temperature-sensitive dopants can now be used for the shaped part. The sintering is now preferably effected in a conventional furnace. Accordingly, in contrast to the Coolidge process, complex shaped part geometries can be sintered. Further, the homogeneous heating has a positive effect on the shrinkage of the shaped part, e.g., as a result of reduced distortion of the shaped part.

Therefore, compared to the conventional, known manufacture of shaped parts—pressing, sintering in a direct current flow, hammering and intermediate annealing—the new production process—pressing, sintering in the furnace—is substantially more economical.

Further, in the shaped part produced by the process according to the invention, the properties of the electrode especially, e.g., ignition characteristics, shelf life, arc stability, etc., are not limited by the sinter-activating additive and the residual porosity specific to production.

Tungsten and/or molybdenum in particular are used as the matrix material of the metal powder for the shaped part.

The metal powder is prepared either by a wet-chemical/ hydrometallurgical process or by a dry mechanical process. This preparation process aims at the most homogeneous and finely dispersed distribution of the sinter-activating additive on the particles of the matrix material of the metal powder. A thin nickel layer on the tungsten grain surface, for example, is required for effective activation of the sintering process, wherein a near-surface tungsten-nickel layer which is presumably marked by growth is formed due to the high solubility and diffusibility of tungsten in nickel.

Two intermediate products—ammonium para-tungstate ($WO(NH_4)_2$) or tungsten trioxide ($WO_3$)—are produced by the wet-chemical hydrometallurgical method for processing of tungsten earths. A water-soluble salt of the crystalline sinter-activating additive, e.g., nickel nitrate $Ni(NO_3)_2$, is added to these intermediate products by spraying or mixing. This mixture can either be subjected to a calcination process, i.e., annealing at a temperature above 300° C., with subsequent reduction or can be subjected directly to a wet reduction with hydrogen at a temperature greater than 600° C. according to the so-called Sherrit-Gordon method.

In the dry-mechanical preparation process, the sinter-activating additives are added as metal powder to the chemically pure matrix material of the metal powder and homogenized in a conventional mixer. Attritors or ball milling can also be used to increase the sinter activity of the metal powder so as to achieve a mechanical alloying of additive material and matrix material.

The addition of the dopant with a low work function to the metal powder can also be effected by means of the wet-chemical hydrometallurgical process or the dry-mechanical process.

The process according to the invention is distinguished by diverse possibilities for compression and shaping, wherein the shaped part is shaped close to its final contour in part during the compression. In particular, the metal powder with its dopants and additives can be compacted by —mechanical-hydraulic pressing;
—cold isostatic pressing;
—extrusion;
—hot isostatic pressing; and/or
—a powdered metal injection molding process and can accordingly also be brought to a shape close to the final contour if required. In so doing, the aim is to achieve a homogeneous minimum density, or green density as it is called, a sufficient strength, so-called green strength, and the required geometry.

When the metal powder with the dopants and additives is compacted and brought to a shape close to the final contour in the manner described above, this intermediate product is sintered. After compaction and before sintering the metal powder with the dopants and additives, it is also possible to produce the shape of the structural part close to final contour by means of cutting. A presintering process may be necessary prior to machining in order to increase the green strength.

Further advantages and features are indicated in the following description of three embodiment examples with reference to the drawings.

DESCRIPTION OF THE PREFERRED EMBODIMENTS

Figure 1:
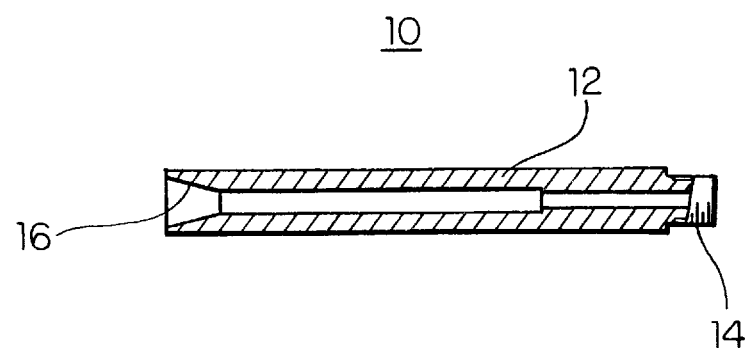
FIG. 1 shows a longitudinal section through a hollow cathode according to a first embodiment form of the invention.

An electrode which is constructed as a hollow cathode 10 is shown in longitudinal section in FIG. 1. This hollow cathode 10 forming a shaped part is used in a known plasma coating process.

The hollow cathode 10 is formed of metal powder 12 substantially comprising 95.5 to 98.9 percent by weight of chemically pure tungsten, a dopant with a low work function, in the present case $LaB_6$ (1.8 to 2.2 percent by weight), and a sinter-activating additive of 0.12 to 0.5 percent by weight nickel.

The metal powder 12 is prepared by the wet-chemical hydrometallurgical process. For this purpose, a liquid nickel nitrate solution is sprayed into tungsten trioxide and thoroughly mixed.

Particles greater than 10 $\mu$m are separated by a subsequent sieving process. The mean grain size of the tungsten powder is between 2 and 3.5 $\mu$m with a cumulative grain size of 90% at 5 $\mu$m.

Lanthanum hexaboride (1.8 to 2.2 percent by weight) with a particle size of 1 to 3 $\mu$m is added in dry form to this tungsten powder in a mixer and homogenized.

The metal powder 12 with the dopants and the additives is poured into elastic, cylindrical tubes, wherein the two stoppers are provided with a central pocket bore hole for receiving a cylindrical pin. The metal powder 12 with the dopants and additives is then subjected to cold isostatic pressing. After talking out the compressed rod and removing the pin, there remains a slender green compact, e.g., with a diameter/length ratio of 6 to 12 and a bore hole diameter/length ratio of 12 to 20.

Alternatively, the metal powder 12 with the dopants and additives can also be compressed by mechanical-hydraulic means. The pressing die is first filled with a defined layer of the metal powder 12 with the dopants and additives. After inserting the pin by laterally guiding it into the pressing die, another defined layer of metal powder 12 with the dopants and additives is poured in. The metal powder 12 is then compressed on two sides. After removing the compressed rod and the pin, a slender green compact with an optionally central or asymmetrical bore hole remains.

The green compacts are sintered indirectly in a furnace at temperatures of 1400° to 1600° C. and a holding time of up to 30 min. In so doing, densities of 80 to 97% of theory are achieved. The weight proportions of the sinter-activating additive and dopant with low work function are between 80 and 100% of the amount originally introduced into the matrix work material of the metal powder 12.

The hollow cathode 10 is inserted into a vacuum coating installation after cutting the thread 14 and functional surfaces 16.

The arc generated by the hollow cathode 10 forms a plasma with a high degree of ionization in addition to an intensive electron beam. This plasma is used as an evaporation source for various materials, e.g., TiN, CrN, TiC.

The operating parameters of the hollow cathode 10 in the vacuum coating installation are as follows:

| | |
|---|---|
| voltage: | 20–40 V |
| current | 50–300 A |
| type of current: | direct current |
| type of gas: | argon 4.8 |
| system pressure: | $10^{-3}$ to $10^{-5}$ mbar. |

The hollow cathode 10 is heated by an external tungsten coil and is ignited after reaching a defined temperature. At a power consumption of 3.5 to 4 kW, the arc can be reliably ignited by the hollow cathode 10. During operation, the hollow cathode 10 exhibits good service life behavior over a number of hours.

Figure 2:
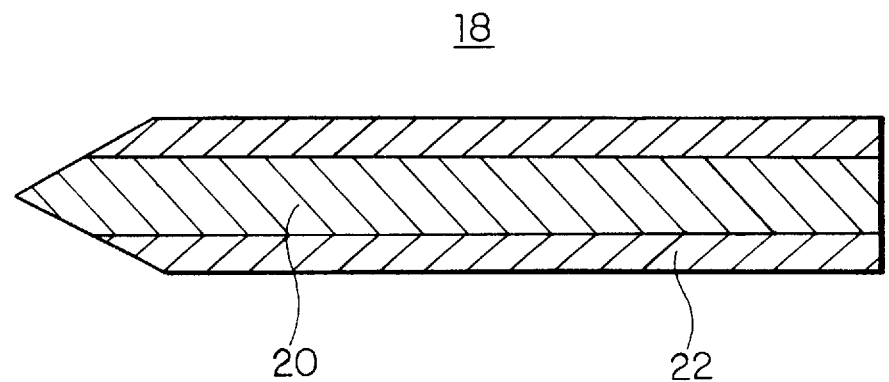
FIG. 2 shows a longitudinal section through a cored electrode according to a further embodiment form of the invention.

FIG. 2 shows a cored electrode 18 in longitudinal section as another embodiment form of the invention.

The cored electrode 18 forming a shaped part has regions produced in two process steps, namely a pin-like electrode core 20 and a cylindrical electrode shell 22, which regions are formed of different compositions of metal powder.

However, the metal powder with the dopants and additives are prepared in the manner described above, wherein the metal powder of the electrode core 20 is a chemically pure tungsten powder with sinter-activating additives and dopants with a low work function and the metal powder of the electrode shell 22 is also a tungsten powder with sinter-activating additives, but without dopants with a low work function.

For the purpose of realizing the electrode geometry, different shaping processes can be used for the two parts.

First, the electrode core 20 is produced by extrusion and then the electrode shell 22 is pressed on to the electrode core 20 by mechanical-hydraulic pressing.

Alternatively, the electrode shell 22 can be sprayed on the electrode core 20 of the cored electrode 18 by a powdered metal injection molding process, this electrode core 20 being produced by isostatic pressing.

An electrode produced in this way has the advantage that there is no drifting of the arc during operation. This effect is present in conventional electrodes when there is a reduction in the doping due to evaporation in the electrode tip. Further, the arc expansion is reduced by increasing the arc spot surface on the electrode tip. From the standpoint of welding technique, an arc expansion in the base material to be welded leads, e.g., to increased burning penetration, an enlarged heat affected zone or low fusion output.

Another embodiment form which is not shown in detail in the drawings is described in the following.

An electrode forming a shaped part according to the invention is produced for TIG welding. The metal powder with the sinter-activating additive is prepared in the same way as the electrode just described. $La_2O_3$ is used as a dopant with a low work function.

The metal powder with the dopants and additives which is prepared in this way is inserted in elastic, cylindrical tubes and pressed by isostatic pressing at 1800 to $3000*10^5$ Pa. The green density reaches values of 55 to 75% of the theoretical density.

The sintering is effected in the manner described in connection with the first embodiment example.

In an application-oriented welding test, a so-called WT20 electrode with 1.8 to 2.2 percent by weight $ThO_2$ which was manufactured in a conventional manner was compared with a so-called WL20 electrode with 1.8 to 2.2 percent by weight $LaO_2O_3$ and 0.5 percent by weight nickel which was produced according to invention in a shape close to the final contour.

The test parameters were as follows:

| | |
|---|---|
| electrode diameter: | 2.4 mm |
| electrode tip angle: | 60° |
| frustum diameter: | 0.2 mm |
| electrode spacing: | 2.5 mm |
| welding current: | 200 A |
| type of current: | direct current |
| polarity: | electrode at negative pole |
| auxiliary ignition: | high-frequency ignition |
| burner: | HW20 with gas lens |
| gas nozzle distance: | 4.5 mm |
| gas nozzle diameter: | 11 mm |
| type of inert gas: | argon 4.8 |
| inert gas flow rate: | 8 l/min. |
| type of weld: | blind weld |
| base material: | St 35-2 |
| welding rate: | 14 cm/min. |
| welding sequence for the ignition tests: | ignition of arc, 1 min. welding time 1 min. pause (cooling) 60 repetitions |
| welding sequence for continuous welding tests: | ignition of arc, 15 min. welding time, 1 min. pause (cooling), 4 repetitions |

When used for welding, current densities of 20 to 30 $kA/cm^2$ resulted at the electrode tip with the parameters indicated above. In comparison to the known WT20 electrode, it was shown very clearly that the electrode temperature of the WL20 electrode according to the invention is appreciably lower. The WL20 electrode according to the invention showed no ring formation, i.e., no dendritic growth of tungsten crystallites above the arc spot.

The WL20 electrode according to the invention also has a high geometric stability of the electrode tip after long operation. Further, there was no evidence of local fusing of tungsten at the electrode tip. In addition, this electrode exhibits improved welding behavior with arc ignition.

In conclusion, the invention is accordingly also distinguished by the fact that the shaped parts according to the invention, especially electrodes, can be used in many different ways, e.g., in arc welding with nonfusing electrodes, as cathodes in arc discharge lighting, for producing arc-based plasmas, in electron tubes, in traveling-wave magnetrons, and also as shields for radiation protection or as melting crucibles. As a result of the low electrode temperature, the electrode material ensures a high dimensional stability of the electrode tip during operation. Another advantage consists in that complex electrode geometries can be realized as is required, e.g., for hollow cathodes, cored electrodes or plasma cathodes.

While the foregoing description and drawings represent the preferred embodiments of the present invention, it will be obvious to those skilled in the art that various changes and modifications may be made therein without departing from the true spirit and scope of the present invention.

| Reference numbers | |
| --- | --- |
| 10 | hollow cathode |
| 12 | metal powder |
| 14 | thread |
| 16 | functional surface |
| 18 | cored electrode |
| 20 | electrode core |
| 22 | electrode shell |

What is claimed is:

1. A process for the production of a high-temperature stressed electrode, produced from a high melting point metal powder having crystalline sinter-activating additives therein, consisting essentially of the steps of preparing, compacting and sintering the metal powder, the improvement further consisting essentially of the step of substantially shaping the metal powder to have a final contour of the high temperature stressed electrode prior to sintering.

2. The process according to claim 1, wherein the metal powder also contains at least one dopant composed of a material with a low work function.

3. The process according to claim 2, wherein up to 5 percent by weight of the dopant with a low work function is contained in the metal powder prior to compacting.

4. The process according to claim 2, wherein the dopant with a low work function is formed of at least one element or an element compound with electron configurations which are unstable with respect to energy, and having electron donor action.

5. The process according to claim 4, wherein the dopant with a low work function is formed by one or more oxides and borides of the elements of groups IIIB to IVB of the periodic table and the first three elements of the lanthanide and actinide groups.

6. The process according to claim 4, wherein the dopant with a low work function is formed by one or more materials selected from the group consisting of $Y_2O_3$, $ZrO_2$, $La_2O_3$, $CeO_2$ and $LaB_6$.

7. The process according to claim 1, wherein the metal powder contains up to 1.0 percent by weight of the sinter-activating additive prior to pressing.

8. The process according to claim 1, wherein the sinter-activating additive is formed by at least one element of Group III of the periodic table.

9. The process according to claim 8, wherein the sinter-activating additive is formed by an element selected from the group consisting of nickel, palladium and platinum.

10. The process according to claim 1, wherein the metal powder is substantially formed of an element selected from the group consisting of tungsten and molybdenum.

11. The process according to claim 1, wherein the metal powder is prepared by a wet-chemical process.

12. The process according to claim 1, wherein the metal powder is prepared by a hydrometallurgical process.

13. The process according to claim 1, wherein the metal powder is prepared by a dry mechanical process.

14. The process according to claim 1, wherein the metal powder is compacted by mechanical-hydraulic pressing.

15. The process according to claim 1, wherein the metal powder is compacted by cold isostatic pressing.

16. The process according to claim 1, wherein the metal powder is compacted by extrusion.

17. The process according to claim 1, further consisting essentially of after being compacted, pre-sintering the metal powder and shaping the metal powder to a shape close to the final contour by cutting the pre-sintered metal powder.

18. The process according to claim 1, wherein the metal powder is compacted by hot isostatic pressing.

19. The process according to claim 1, wherein the metal powder is compressed by a powdered metal injection molding process.

20. The process according to claim 1, comprising 95.5 to 98.9% by weight of chemically pure high melting metal powder.

* * * * *